United States Patent
Schwandner et al.

(10) Patent No.: US 8,320,757 B2
(45) Date of Patent: Nov. 27, 2012

(54) METHOD AND DEVICE FOR STARTING UP AN OPTICAL TRANSMISSION LINK

(75) Inventors: Alfred Schwandner, Metzels (DE); Oliver Bleck, Geretsried (DE)

(73) Assignee: ADVA Optical Networking SE, Meiningen (DE)

( * ) Notice: Subject to any disclaimer, the term of this patent is extended or adjusted under 35 U.S.C. 154(b) by 889 days.

(21) Appl. No.: 12/294,019

(22) PCT Filed: Mar. 22, 2006

(86) PCT No.: PCT/DE2006/000505
§ 371 (c)(1), (2), (4) Date: Nov. 12, 2008

(87) PCT Pub. No.: WO2007/107126
PCT Pub. Date: Sep. 27, 2007

(65) Prior Publication Data
US 2009/0087195 A1    Apr. 2, 2009

(51) Int. Cl.
*H04B 10/08* (2006.01)
*H04B 10/04* (2006.01)

(52) U.S. Cl. ............ 398/1; 398/2; 398/3; 398/4; 398/5; 398/6; 398/7; 398/8; 398/16; 398/17

(58) Field of Classification Search ............... 398/1–8, 398/16, 17
See application file for complete search history.

(56) References Cited

U.S. PATENT DOCUMENTS

| 5,136,410 A | 8/1992 | Heiling et al. |
| 6,792,005 B1 * | 9/2004 | Antosik et al. ............... 370/535 |
| 2002/0089713 A1 * | 7/2002 | Schwandner et al. ........ 359/110 |
| 2002/0162045 A1 * | 10/2002 | Shiragaki ........................ 714/4 |
| 2003/0048512 A1 | 3/2003 | Ota |
| 2006/0198634 A1 * | 9/2006 | Ofalt et al. ....................... 398/16 |

FOREIGN PATENT DOCUMENTS

| DE | 4436131 A1 | 4/1996 |
| EP | 0 437 162 A2 | 7/1991 |
| WO | WO 02/27978 A | 4/2002 |

* cited by examiner

*Primary Examiner* — Patrick Stafford
*Assistant Examiner* — Michael Carter
(74) *Attorney, Agent, or Firm* — The Culbertson Group, P.C.

(57) ABSTRACT

Schemes are provided for starting up optical transmission links where, after a link interruption, endpoints switch into a startup mode original detection state, and a query-transmit pulse goes out at both end points at given time intervals. In a "TRANSMITTED" handshake mode, in a loop to be passed through n times, and at least once, after the transmission of a transmit pulse, it is detected whether a received pulse is received within a given time span. If no received pulse is received, then the mode is ended and the system is returned to the original detection state. If a received pulse is received, it is answered with another transmit pulse. After the last transmit pulse, if another received pulse occurs within a given time span, the link is activated. If not, the "TRANSMITTED" handshake mode ends and the system enters the original detection state.

6 Claims, 2 Drawing Sheets

METHOD AND DEVICE FOR STARTING UP AN OPTICAL TRANSMISSION LINK

TECHNICAL FIELD

The present invention relates to a method for starting up an optical transmission link and also to a device for implementing the method.

BACKGROUND

An optical transmission link is typically composed of an optical transmit-and-receive device, wherein the function of a converter or a repeater amplifier can also be integrated into this transmit-and-receive device, at each end point of the optical link that can be composed of one or more optical waveguides. In this way, incoming signals, which could be of an optical or electrical type, are amplified, processed, or converted, in order to further process or forward them. Such an optical transmit-and-receive device can be connected, for example, between a local-area network (LAN) and a wide-area network (WAN) in order to shift the data transmission from one optical wavelength to another. Likewise, such a transmit-and-receive device can also be used for signal processing or as an amplifier unit within wide-area networks. Likewise, optical transmit-and-receive devices of this type can also be used to convert electrical signals fed from the outside into optical signals and vice versa. Usually, two or more such links (sections of optical transmission links with two transmit-and-receive devices at the end points of an optical link) are coupled to form an entire transmission link.

The optical transmission is typically performed via optical waveguides at wavelengths of, for example, 1310 nm in local-area networks or 1550 nm for greater distances. In this way, transmission rates of currently up to several 10 Gbps are achieved. Transmitted and received data can be transmitted within a link on a common optical waveguide or on separate optical waveguides. For shared transmission on one optical waveguide, signals to be transmitted and received are separated with a selective coupler before the input and after the output, respectively, of a transmit-and-receive station or also within such a station.

Various methods for checking or for starting up transmission links, in particular, links of transmission paths, are known. They are carried out during the setup of data-transmission devices or also after data transmission has been interrupted, in order to ensure that proper communications can be established between two or more transmit and receive stations.

For the optical data transmission, high transmit powers are used, especially in wavelength division multiplex systems (WDM systems). The light signals that are emitted in this way and that are transmitted from one station to the other can be dangerous to the human eye if the eye is exposed to such radiation for a certain duration. This can happen, for example, when an optical waveguide that is in use is severed during roadwork or underground work and a third party examines the damaged cable. Likewise, through intentional breaking of the connection, such as, for example, when detaching a plug connection of an optical waveguide, this radiation can be emitted and can enter the human eye. To counteract the risk of injury to the eye, according to known methods, it is typical to stop the transmission operation immediately after the detection of an interruption if a line breaks or if there is some other unintentional interruption of the connection.

For reestablishing the transmission operation after such an interruption or for the first-time setup, initially the functionality of the transmission link must be tested.

In German Patent Application No. DE 44 36 131 A1 a method is presented that uses a so-called dummy telegram for such function testing. Disadvantageously, the method must work with a minimum signal period, and the time-intensive transmission of several dummy telegrams one after the other in the same direction is also required.

In practice, function testing usually takes place in such a way that test signals (for example, pulse trains) are transmitted and the type and duration of these signals (for example, pulse duration shorter than 5 ms) are set by laser protection classes. In the sense of a query, a test signal is introduced into the transmission link by a first transmit-and-receive station, in order to be received by a second such station when the transmission path is intact, at least in this direction.

When such a test signal is received and evaluated, the second station transmits this same signal as an answer signal back in the other direction of the transmission link to the first station. The first station assumes the transmission mode only after receiving an incoming signal interpreted as a corresponding answer, because the transmitted test signal and a subsequently arriving answer signal are considered evidence that a transmission link is operating according to regulations.

In the state of the art, such test signals are transmitted at given time intervals and with a fixed time duration of, for example, 2 ms. Within a certain time span (time window) after transmitting a test signal, a signal must appear as an answer from the opposing station, in order to indicate the functionality of the transmission link. The test and answer signals do not differ from each other; all that is important is that the querying station receive an answer signal within the given time span after transmitting the test signal.

However, here the disadvantage is the risk that a signal of a first station understood as an answer was actually only a test signal that was transmitted by a second station, in order to test, on its side, the functionality of the transmission link. In this case, the first station would assume the transmission mode after the apparent confirmation of the functionality by the opposing station, even though it was possible that the test signal transmitted by it never reached the second station—due, for example, to a break in the line of an optical waveguide. Then high-energy radiation that could possibly be dangerous would be emitted at the location of the break.

In practice, this problem should be minimized in that the time points at which a station transmits a test signal and the time span within which an answer signal is expected are set randomly. This should prevent the situation that individual stations transmit test signals that could be mistakenly understood as answer signals at possibly the same cycles and, in the most unfavorable situation, at similar time points. However, this solution does not offer total security from such "misunderstandings," because even transmit time points selected at random could lie so close to each other that incoming signals could be interpreted as answer signals.

Here, the method must also disadvantageously work with a very narrow time window after transmission of a test signal within which a detection of a signal as an answer signal is possible. This increases the technical expense and the error susceptibility of the system. In addition, the maximum length of the transmission link is limited by this time window and the signal propagation time or the signal processing time.

For test purposes, such a transmit-and-receive station can also be switched ("looped") into loop mode. Here, for example, the optical input is directly connected to the optical output, so that a received signal is transmitted back in the same direction without evaluation or processing. Such a loop can also be connected so that incoming optical signals are first converted into electrical signals and then back into optical signals before they are transmitted back in the same direction. Finally, in a loop circuit, electrical processing of incoming signals with respect to timing recovery and bit pattern is also possible before the signals are transmitted back. In the loop mode, however, the incoming signal is typically not tested or evaluated. A loop circuit of a second transmit-and-receive device that is connected to a first transmit-and-receive device can be advantageous, for example, for measuring properties of the transmission link, such as propagation time or signal-to-interference ratio.

The test method for testing the functionality of a transmission link according to the state of the art also functions when a station is switched into loop mode, because the incoming test signal is then immediately transmitted back as the answer signal.

In so-called Open Fibre Control according to the ANSI standard, both transmit-and-receive devices at the end points of a link transmit a pulse of 617 µs long every 10.1 sec independently of each other. If the first transmit-and-receive device receives a pulse from the second transmit-and-receive device, the second transmit-and-receive device immediately transmits a pulse 617 µs long. This pulse transmitted by the second transmit-and-receive device must arrive at the first transmit-and-receive device before the query pulse transmitted by this first device has ended. This method is executed twice, wherein, in this second execution, the transmit-and-receive devices continue to transmit as long as a receive signal is detected from the other transmit-and-receive device. In this way the connection is established.

The essential disadvantage of this method is that, due to the pulse length of 617 µs, the roundtrip time and thus the length of the link is limited to approximately 60 km. If a delay time for detecting the pulses is also considered, this would produce, in practice, a limit to the maximum link length of approximately 35 km.

German Patent Application DE 100 58 776 C1 describes a method for testing the functionality of an optical transmission link, wherein this method works with different lengths of query and answer pulses. This avoids limiting the link length. A disadvantage, however, is the evaluation of the pulse length. This evaluation produces corresponding expense. In addition, the pulse length can be shortened by optical amplifiers and regenerators in the link, so that incorrect interpretations are possible.

SUMMARY OF THE INVENTION

Methods are provided for starting up an optical transmission link, wherein this method is to be realized in a simple way and is to reliably recognize functionality. In addition, the method according to the invention should require practically no limiting of the maximum link length. Also provided is a device for starting up an optical transmission link and also an optical transmit-and-receive device for realizing such a device.

A fast and reliable testing of the functionality of the link can be performed (and confirmed) in a simple way through a simple handshake of query and answer pulses executed between the two transmit-and-receive devices at the end points of an optical transmission link, if, at least in the case of the transmit-and-receive device that transmits the query-transmit pulse initiating the handshake, a first "answer pulse" arrives at this transmit-and-receive device within a predetermined time span and if, in addition, another "answer pulse" to at least one other transmit pulse that was generated by this transmit-and-receive device as an answer to a previously received "answer pulse" arrives at this transmit-and-receive device. A received "answer pulse" can be, in principle, either an actual answer pulse, i.e., a reaction of the other transmit-and-receive device to a pulse transmitted from the relevant transmit-and-receive device or a query-transmit pulse transmitted by the other transmit-and-receive device or else also an interference pulse.

In principle, absolutely no testing of whether the received pulses have a certain time duration or satisfy additional criteria is required.

The pulses can involve simple pulses with a defined pulse duration that, however, can be selected arbitrarily and that also need not be constant or actual pulses, i.e., pulse trains, whose data rate corresponds to data rates typically transmitted via the relevant transmission link. This has the advantage, for example, that a clock-and-data recovery unit in the relevant transmit-and-receive device can be used to determine whether this "locks" onto the received pulse. A signal indicating the "locking" of the clock-and-data recovery unit can then be evaluated as another received pulse to be processed. For example, the rising edge of this signal can be considered as a sign and time point for receiving a received pulse. In this way, individual interference pulses can be recognized and suppressed.

While in the previously described "TRANSMITTED" handshake mode, at least two "answer pulses," i.e., two received pulses, must be detected within a given time span after the transmission of each transmit pulse in order to recognize an intact transmission link; in the "RECEIVE" handshake mode, the receipt of only at least one "answer pulse" within a given time after the transmission of each transmit pulse is required.

Here it is possible that a "TRANSMITTED" handshake mode is executed in both transmit-and-receive devices at the end points of the relevant link, if these are both randomly set to the "TRANSMITTED" handshake mode—since the transmission of query-transmit pulses is not executed in sync—when a query-transmit pulse was transmitted before the relevant query-transmit pulse of the other transmit-and-receive device is received as a (valid) received pulse. With the method according to the invention, however, this case also leads to a correct startup of the transmission link.

According to the preferred embodiment of the method according to the invention, during the time period in which the "TRANSMITTED" handshake mode is maintained, including the relevant query-transmit pulse, a maximum of n+1 transmit pulses ($P_{1T,\#1}$ to $P_{(n+1)T,\#1}$) are transmitted at the relevant end point. In the same way, advantageously during the time period in which the "RECEIVED" handshake mode is maintained, a maximum of n+1 transmit pulses ($P_{1T,\#2}$ to $P_{(n+1)T,\#2}$) are transmitted.

According to the invention, during the "RECEIVE" handshake mode and/or during the "TRANSMITTED" handshake mode, the received pulses, including a first received pulse for triggering the "RECEIVE" handshake mode, can be counted, wherein, when more than a given number of received pulses greater than n+1 is detected, the system is moved into the original detection state and/or an error signal is generated. In this way, the sensitivity of the method to interference pulses can be reduced.

For example, the activation of the relevant transmit-and-receive device can stop at the completion of the startup mode for transmission in the direction toward the other transmit-and-receive device, if more than the permissible number of received pulses is detected during the handshake time, because in this case it must be assumed that the transmission link has an unacceptable level of interference or the receive device is faulty.

According to the invention, the activation of the transmission in the direction toward the relevant end point of the transmission link can be recognized as a received pulse, because, in principle, the pulse duration of received pulses is not evaluated.

In this case, by limiting the maximum possible number of transmit pulses during a handshake time, it is to be avoided that another transmit pulse is transmitted by the receiving transmit-and-receive device, as was explained above. Because the activation of the transmit-and-receive devices for transmission in the direction toward the other transmit-and-receive device does not have to be performed in sync, it is possible that one of the two transmit-and-receive devices is activated at an earlier time and consequently the activation of the other transmit-and-receive device is performed within the time span that is decisive for the recognition of a received pulse since the transmission of the last transmit pulse.

In this case, it is also to be guaranteed that the receipt of one additional received pulse exceeding the given number of n+1 received pulses is tolerated, without returning to the original detection state. Here, the higher the number of additional tolerated received pulses, the more interference pulses are tolerated and the greater the risk that the relevant transmit-and-receive device will be wrongly activated.

According to the preferred embodiment of the invention, another transmit pulse is then transmitted at the earliest when the previously transmitted transmit pulse has ended. In this way it is guaranteed that the individual transmit pulses from the other transmit-and-receive device can still be detected as separate received pulses, without having to perform further testing of a received pulse regarding whether it is assembled from two transmit pulses. The additional transmit pulse can be transmitted a given time span after the beginning or the end of the previously transmitted transmit pulse. For example, with the rising edge of the preceding transmit pulse, a timer can be started and the next transmit pulse can be transmitted only when the time of the timer has elapsed. In this case, the time of the timer must be selected large enough with reference to the pulse duration that after the time of the timer elapses, the preceding pulse has reliably ended.

The transmit-and-receive device according to the invention is constructed such that it executes the method according to the invention when it is used at the end point of an optical transmission link. In particular, such a transmit-and-receive device can comprise a microcontroller circuit in combination with software or firmware suitable for executing the method.

Additional embodiments of the invention emerge from the subordinate claims and the description and drawings.

The invention will be explained in more detail below with reference to an embodiment shown in the drawings.

DETAILED DESCRIPTION

Figure 1:
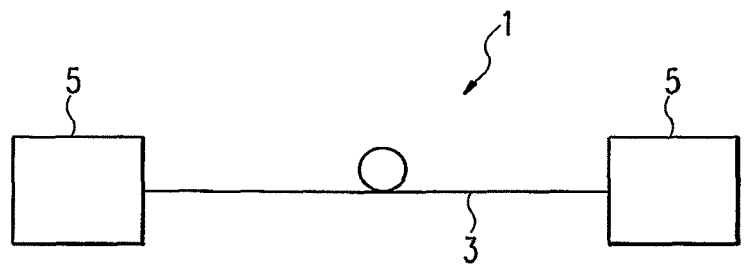
FIG. 1 is a schematic diagram of a link of an optical transmission path.

FIG. 1 shows a schematic block diagram of an optical transmission link 1 comprising an optical connection path composed of, for example, one or more optical waveguides 3. The transmission link is connected at both ends to a transmit-and-receive device 5. Each transmit-and-receive device 5 can involve an entire transmission link or a transmit-and-receive device terminating a traffic connection or it can involve a node of an entire network or a repeater. Thus, very generally, the optical transmission link 1 according to FIG. 1 can also be understood as a link of an entire transmission path.

At this point, it should be noted that each transmit-and-receive device 5 does not have to be realized in a single unit. Instead, each transmit-and-receive device can also be locally distributed, so that different functions can also be assumed by different components at other positions.

The optical connection path is typically realized by means of two optical waveguides 3, wherein each of the two optical waveguides 3 is used for one of the transmission directions of the bi-directional transmission path. The following statements, however, have equivalent validity for an optical connection path made from a single optical waveguide 3.

As already stated above, it is necessary for the first startup of the optical transmission link 1 or for a previous interruption in which the transmit-and-receive devices 5 interrupt the transmission in the direction toward the other end point of the connection path 3 that the functionality of the transmission link be tested, and if it is found to be functional, that the transmission link be started up again, i.e., to allow signal transmission.

For this purpose, after the detection of an interruption, for which reason this also always follows, the transmit-and-receive devices switch into a startup mode in which, initially in an original detection state, a first query-transmit pulse $P_{1T,\#1}$ is fed to the transmission link at both end points at given time intervals $TR_P$. The time intervals can each equal, for example, 10 sec.

Figure 2:
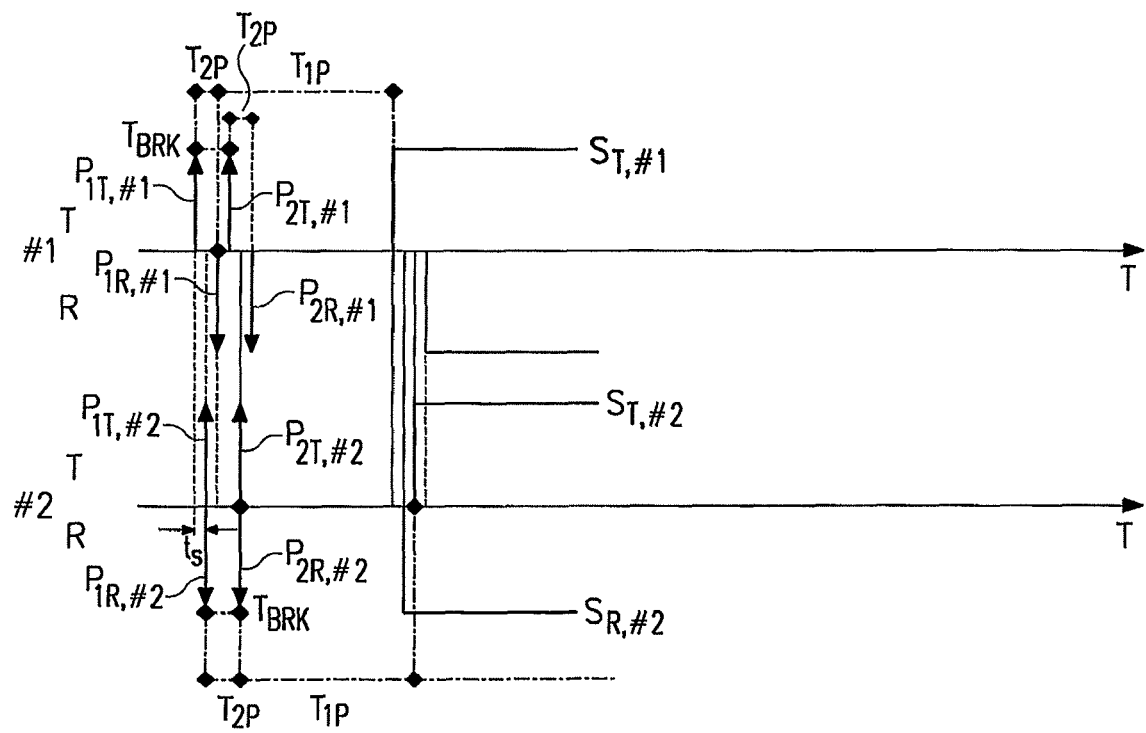
FIG. 2 is a timing diagram for explaining the method for starting up an optical transmission link with small signal propagation time.

FIG. 2 shows a timing diagram for explaining the startup mode that ends when the relevant transmit-and-receive device 5 was activated for the first time or again for transmission in the direction toward the other transmit-and-receive device 5. In the example shown in FIG. 2, an optical transmission link is started up that advantageously has a relatively short length of the optical connection path in the form of two optical waveguides 3. Accordingly, a relatively short signal propagation time between the end points of the optical connection path is produced. Because the transmit-and-receive devices 5 are not in sync with respect to the transmission of the query-transmit pulse $P_{1T,\#1}$, in the embodiment shown in FIG. 2 it is assumed that a transmit-and-receive device designated by #1 transmits a query-transmit pulse $P_{1T,\#1}$ as the first device. After a signal propagation time $t_S$, it reaches the other transmit-and-receive device 5 and is detected by it as a first received pulse $P_{1R,\#2}$. Here, the signal propagation time includes both the pure optical propagation time caused by the optical connection path and also electrical signal propagation times caused by corresponding processing electronics up to the detection of the relevant pulse.

For the sake of simplicity, in FIG. 2 the transmit pulses and received pulses are drawn as single-headed arrows, but in practice a transmit pulse can be, for example, a few milliseconds long. In FIG. 2, transmitted pulses are drawn as upward arrows in the corresponding diagram for the end points #1 and #2, and the pulses received at the relevant end point are drawn as downward arrows.

With the transmission of the first query-transmit pulse $P_{1T,\#1}$, the relevant transmit-and-receive device 5 with the already activated startup mode comes into a "TRANSMIT-TED" handshake mode, which can also be designated as master mode.

When the first received pulse $P_{1R,\#2}$ is received within the already active startup mode, the other transmit-and-receive device #2 changes into a "RECEIVE" handshake mode, which could also be designated slave mode, as long as the relevant transmit-and-receive device 5 is not already in master mode when the first received pulse $P_{1R,\#2}$ is received. Because this is not the case in the example shown in FIG. 2, the transmit-and-receive device 5 at the end point #2 of the transmission link 1 is operated in slave mode.

The transmit-and-receive device 5 at end point #1 in master mode waits for whether a first received pulse $P_{1T,\#1}$ is received within a predetermined time $T_{2P}$ after the transmission of the first transmit pulse $P_{1T,\#1}$. This is the case in the embodiment shown in FIG. 2. Then the transmit-and-receive device 5 at the end point #2 of the transmission link 1 transmits a first transmit pulse $P_{1T,\#2}$ as an answer immediately after the detection of the first received pulse $P_{1R,\#2}$ in the slave mode. This transmit pulse is received at end point #1 by the relevant transmit-and-receive device 5 as the first received pulse $P_{1R,\#1}$ within the time $T_{2P}$.

The transmit-and-receive device 5 at the end point #1 detects this receipt of the answer pulse $P_{1R,\#1}$ and would actually react to it with the immediate transmission of a second transmit pulse $P_{2T,\#1}$. To avoid the overlapping of two subsequent transmit pulses, however, another timer is realized both in the master mode and also in the slave mode, wherein another transmit pulse $P_{iT,\#1}$ is transmitted at the earliest when the associated time $T_{BRK}$ of the timer has elapsed. If the timer for the time $T_{BRK}$ is started with the rising edge of a transmit pulse, then the time $T_{BRK}$ of the timer must be larger than the pulse duration.

In the example shown in FIG. 2, at the receipt of the pulse $P_{1R,\#1}$ at the end point #1 of the transmission link 1, the time $T_{BRK}$ of the timer has not yet elapsed. Consequently, the relevant transmit-and-receive device 5 waits until the time $T_{BRK}$ has elapsed, i.e., the relevant timer has elapsed and only then transmits the additional transmit pulse $P_{2T,\#1}$.

Simultaneously with the receipt of the received pulse $P_{1R,\#1}$, the transmit-and-receive device 5 at the end point #1 stops the timer for the time $T_{2P}$ and starts another timer for the time $T_{1P}$, whose meaning will be explained further below. The timer will be restarted for the time $T_{2P}$ with the transmission of the additional transmit pulse $P_{2T,\#1}$.

Within the time $T_{2P}$, the transmit-and-receive device 5 at the end point #1 receives the additional received pulse $P_{2R,\#1}$. This received pulse $P_{2R,\#1}$ corresponds to a transmit pulse $P_{2T,\#2}$ that was transmitted by the transmit-and-receive device at the end point #2 and that is transmitted by this transmit-and-receive device 5 as a reaction to a received pulse $P_{2R,\#2}$ received from this device. This received pulse $P_{2R,\#2}$ corresponds to the additional transmit pulse $P_{2T,\#1}$ transmitted by the transmit-and-receive device 5 at the end point #1.

In this way, in the case of the transmit-and-receive device 5 at the end point #2, the delay time $T_{BRK}$ has definitely already elapsed at the receipt of the received pulse $P_{2R,\#2}$, because the other transmit-and-receive device 5 has transmitted the associated transmit pulse $P_{2T,\#1}$ only after the time $T_{BRK}$ has elapsed.

In the embodiment shown in FIG. 2, both in the master mode and also in the slave mode, the transmission of more than two transmit pulses $P_{iT,\#1}$ or $P_{iT,\#2}$ is prevented. This means that, in the master mode, the actual handshake between the two transmit-and-receive devices 5 is completed after the transmission of two transmit pulses $P_{iT,\#1}$ and the receipt of the last received pulse $P_{2R,\#1}$ interpreted as an answer pulse. In the slave mode, the associated handshake is completed after the transmission of the last, i.e., after the transmission of the second transmit pulse $P_{2T,\#2}$ as a reaction to the receipt of a second received pulse $P_{2R,\#2}$ detected as a valid answer pulse.

In principle, both transmit-and-receive devices 5 can be activated directly after the completion of each handshake for the transmission in the direction toward the other transmit-and-receive device. As explained below, the method can be constructed in a simple way to be more error tolerant if the activation of the transmission takes place at the earliest after a predetermined time. Here, both in the master and also in the slave mode, the number of total received pulses $P_{iR,\#1}$ or $P_{iR,\#2}$ is counted. Because a maximum of two received pulses is required for a valid handshake, the occurrence of more than two pulses up to the activation of the transmission by the relevant transmit-and-receive device can be recognized as an error. Such interference pulses can be caused by crosstalk or by the switching on of additional transmit elements in the entire transmission link. To avoid starting up the optical transmission link due to such interference pulses, the time between the beginning of a master or slave mode and a possible activation of the transmission is, if necessary, "artificially" lengthened for successful execution of the relevant mode, when the actual handshake is executed very quickly due to low signal propagation times.

Here, in the example shown in FIG. 2 of the transmit-and-receive device 5 in master mode at the end point #1, a timer for a time $T_{1P}$ is started with the receipt of the received pulse $P_{1R,\#1}$. In the shown example, the time $T_{1P}$ of the timer clearly runs after the completion of the actual handshake. The relevant transmit-and-receive device 5 is activated only after the time $T_{1P}$ of the timer has elapsed, i.e., the transmit signal $S_{T,\#1}$ is switched on at this time point.

In the transmit-and-receive device 5 in slave mode at the end point #2, the timer for the time $T_{1P}$ is started with the receipt of the last received pulse $P_{2R,\#2}$. After the timer has counted down to zero, this transmit-and-receive device is also activated for the transmission, i.e., the transmit signal $S_{T,\#2}$ is transmitted starting at this time point.

In this implementation of the method, because the transmit-and-receive device 5 at the end point #2 also receives the signal $S_{T,\#1}$ transmitted by the other transmit-and-receive device 5 as the receive signal $S_{R,\#2}$ and this rising edge can also be interpreted as a received pulse as a function of the detection method for a received pulse, the appearance of a single additional received pulse is tolerated within the time $T_{1P}$ of the timer that can be interpreted as the filter time.

As will be clear from the examples explained below, because the signal $S_{T,\#1}$ or $S_{T,\#2}$ transmitted by the other transmit-and-receive device 5 can be received and interpreted as another answer pulse within the time $T_{1P}$ of the timer also in the case of a transmit-and-receive device 5 in the master mode, the appearance of a single additional received pulse is tolerated during the filter time $T_{1P}$ in the master mode.

Obviously, the filter time $T_{1P}$ can start or the associated timer can be started as a function of other events, for example, both in the master mode and also in the slave mode as a function of the last received pulse $P_{2R,\#1}$ or $P_{2R,\#2}$. All that must be ensured is that there is a sufficient time span up to the activation of the relevant transmit-and-receive device 5, wherein this time span should be made large enough that corresponding interference pulses can appear within this time period with sufficient likelihood.

Obviously, both in the master mode and also in the slave mode, the occurrence of more than one additional received pulse can be tolerated. In this case, however, the method would become more susceptible to interference.

The method described in FIG. 2 and below also with reference to FIGS. 3 and 4 can also be generalized to the extent that, instead of only two transmit pulses in the master or slave mode, overall, n+1 transmit pulses are transmitted.

Here, in the master mode, a received pulse $P_{iR,\#1}$ must be answered with a transmit pulse $P_{iT,\#1}$ only n times. Incidentally, the method runs analogously to the example n=1 shown in FIGS. 2-4.

In the slave mode, for generalizing the method, it must be checked n times whether a received pulse $P_{(i+1)R,\#2}$ to be interpreted accordingly as an answer pulse to a transmit pulse $P_{iT,\#2}$ has been received, wherein the last received pulse $P_{(n+1)R,\#2}$ is also answered with an answer pulse $P_{(n+1)T,\#2}$.

In this general case, in an analogous way to the special case explained above for n=1 (cf. FIGS. 2-4) a number of n+2 received pulses are tolerated in the time between the start of the master or slave mode and the activation of the corresponding transmit-and-receive device 5.

The sequence of a successful handshake in the master or slave mode up to the activation of the relevant transmit-and-receive device 5 was explained above. Obviously, the relevant master or slave mode would be interrupted and the relevant transmit-and-receive device 5 would revert back to the original detection state if the received pulse $P_{iR,\#1}$ or $P_{(i+1)R,\#2}$ to be expected from a transmit pulse $P_{iT,\#1}$ or $P_{iT,\#2}$ did not appear within the maximum permissible time $T_{2P}$. In addition, the master or slave mode is ended if, as stated above, the permissible number of received pulses is exceeded within the time between the start of the relevant mode and the elapsing of the time for the activation of the relevant transmit-and-receive device.

Figure 3:
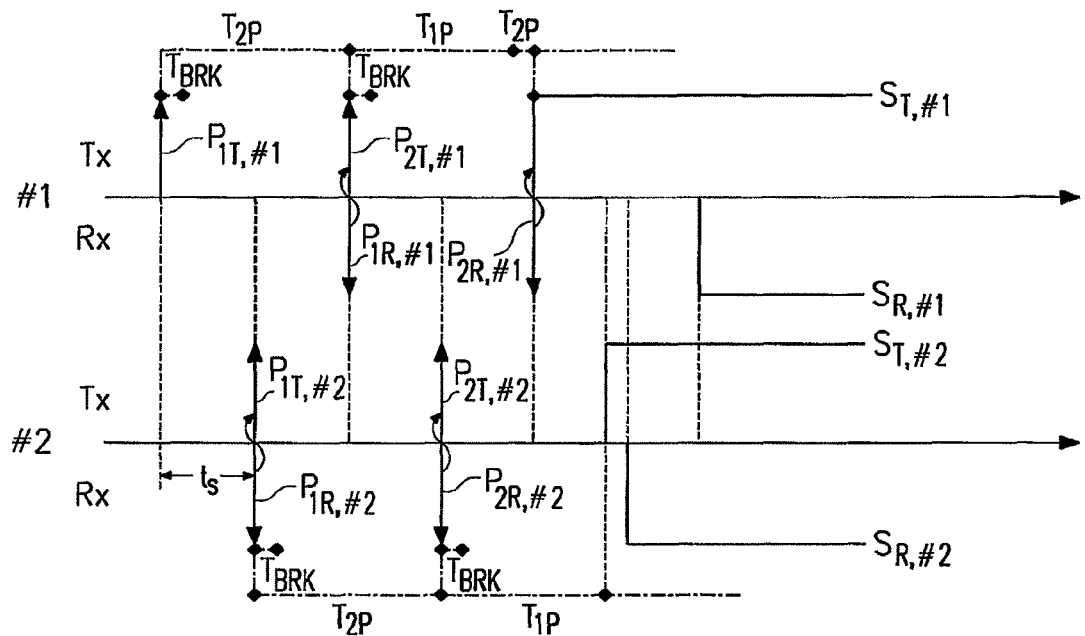
FIG. 3 is a timing diagram for explaining the method for starting up an optical transmission link with long signal propagation time.

Also in the example of the method shown in FIG. 3 for starting up an optical transmission link 1, the relevant handshake between the two transmit-and-receive devices 5 at the end points #1 and #2 of the transmission link is initiated by the transmit-and-receive device 5 at the end point #1. This means that the transmit-and-receive device 5 at the end point #1 is in master mode and the transmit-and-receive device 5 at the end point #2 is in slave mode.

In contrast to the example explained in FIG. 2, however, this involves an optical transmission link with a relatively large signal propagation time $t_S$. Due to this large signal propagation time $t_S$, the time $T_{BRK}$ of the timer no longer plays a role, because in each case it has elapsed before an answer to a previously transmitted transmit pulse appears.

In the example shown in FIG. 3, apart from the greater signal propagation time $t_S$ and apart from a delay of the second transmit pulse $P_{2T,\#1}$ that is no longer necessary, the actual handshake runs identically as explained above in connection with the timing diagram according to FIG. 2.

Also, the actual activation of the transmit-and-receive device 5 at the end point #2, i.e., the switching on of the signal $S_{T,\#2}$, takes place in an identical way, because the time $T_{1P}$ of the timer is started with the receipt of the second received pulse $P_{2R,\#2}$.

The method differs, however, with the activation of the transmit-and-receive device 5 that is in the master mode. Here, the time $T_{1P}$ of the timer is started with the receipt of the first received pulse $P_{1R,\#1}$ and has already elapsed in the example shown, due to the large signal propagation time, before the second received pulse $P_{2R,\#1}$ appears as a reaction to the second transmit pulse $P_{2T,\#1}$. The signal $S_{T,\#1}$ is thus transmitted only after detecting the received pulse $P_{2R,\#1}$, i.e., the relevant transmit-and-receive device 5 is activated for the transmission. Here, the filter time $T_{1P}$ is thus selected to be smaller than the maximum permissible roundtrip time $T_{2P}$.

Figure 4:
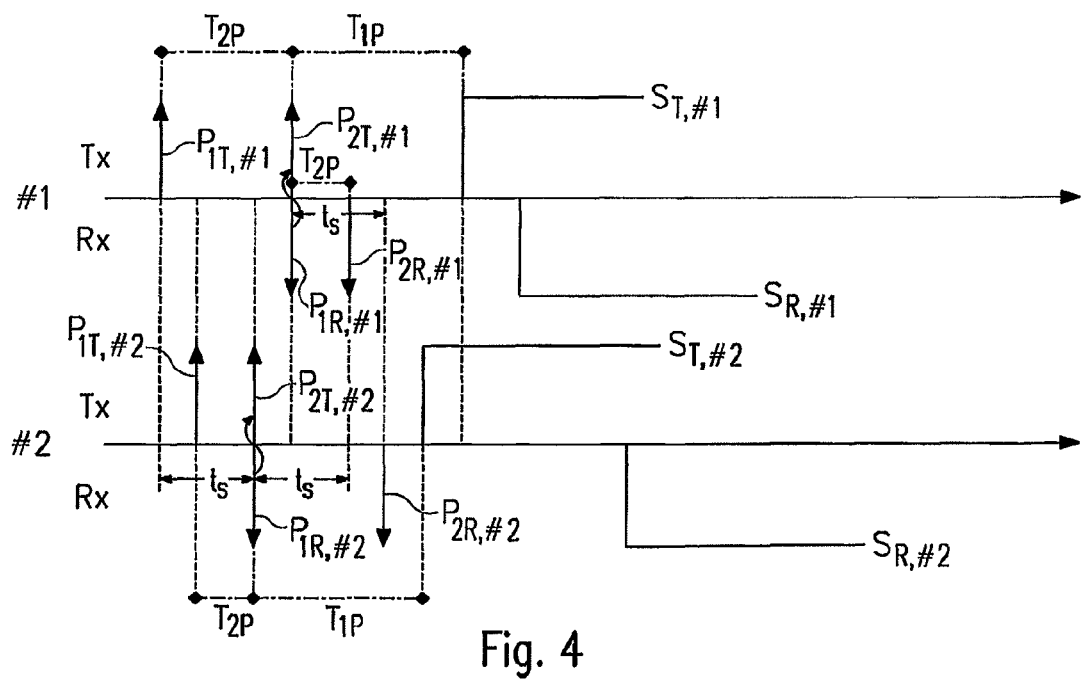
FIG. 4 is a timing diagram for explaining the special case in which both transmit-and-receive devices at the end points operate in the master mode.

Finally, FIG. 4 shows the special case in which both transmit-and-receive devices 5 at the end points #1 and #2 operate in the master mode. This case appears when both transmit-and-receive devices 5 transmit a first transmit pulse $P_{1T,\#1}$ or $P_{1T,\#2}$ before the other transmit-and-receive device 5 receives, due to a correspondingly large signal propagation time $t_S$, the transmit pulse $P_{1T,\#1}$ or $P_{1T,\#2}$ transmitted in the direction toward it as received pulse $P_{1R,\#2}$ or $P_{1R,\#1}$.

Also in this case, the first received pulse $P_{1R,\#1}$ or $P_{1R,\#2}$ would be immediately answered by the two transmit-and-receive devices 5 with a transmit pulse $P_{2T,\#1}$ or $P_{2T,\#2}$, if the delay time $T_{BRK}$ has already elapsed. This is the case in FIG. 4. Otherwise the system waits until the time $T_{BRK}$ has elapsed. Upon detection of the second received pulse $P_{2R,\#1}$ or $P_{2R,\#2}$, the actual handshake ends. In this case it is to be stated that the received pulses in no way involve a reaction of the other transmit-and-receive device to a transmit pulse of the transmit-and-receive device in question. However, this is insignificant for the correct result of the method.

Because the filter time $T_{1P}$ is started with the receipt of the first received pulse $P_{1R,\#1}$ or $P_{1R,\#2}$, in the master mode it cannot normally occur, as shown in FIG. 4, that a receive signal $S_{R,\#1}$ or $S_{R,\#2}$ that could be interpreted, according to the embodiment, as a valid received pulse is detected before the filter time $T_{1P}$ has elapsed, if the start of the filter time $T_{1P}$ is defined in the manner described above. This could then happen, if need be, when the two transmit-and-receive units 5 transmit simultaneously and the signal propagation time $t_S$ also tends toward zero. In this case, due to jitter when the start for the signals $S_{T,\#1}$ or $S_{T,\#2}$ is generated, it could happen that, during the master mode, a third received pulse (or in general: a (n+2)-th received pulse) is detected. Thus, in the master mode, it is also recommended to tolerate at least one additional pulse.

As used herein, the terms "comprising," "including," "carrying," "having," "containing," "involving," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for starting up an optical transmission link,
   (a) in which, after detecting a broken connection, a system is first switched into a startup mode in an original detection state, a query-transmit pulse ($P_{1T,\#1}$) is then fed to the transmission link at two endpoints at given time intervals ($T_{RP}$);
   (b) wherein, after transmission of the query-transmit pulse ($P_{1T,\#1}$) at a relevant endpoint of the two endpoints, in a "TRANSMITTED" handshake mode, the following actions are performed:
      (i) repeating a loop n times and at least once, the loop beginning after, transmitting the query-transmit pulse ($P_{1T,\#1}$), first detecting whether a received pulse ($P_{iR,\#1}$) is received within a given time span ($T_{2P}$), wherein the given time span ($T_{2P}$) is longer than a duration of the query-transmit pulse ($P_{1T,\#1}$), then
    (1) ending the "TRANSMITTED" handshake mode and returning to the original detection state if the received pulse ($P_{iR,\#1}$) is not received;
    (2) answering with another transmit pulse ($P_{(i+1)T,\#1}$) if the received pulse ($P_{iR,\#1}$) is received;
  (ii) after transmitting a last additional transmit pulse ($P_{(n+1)T,\#1}$), detecting whether another received pulse ($P_{(n+1)R,\#1}$) is received within the given time span ($T_{2P}$);
    (1) ending the "TRANSMITTED" handshake mode and returning to the original detection state if no other received pulse ($P_{(n+1)R,\#1}$) is received;
    (2) activating transmission of data towards the other endpoint of the optical transmission link at the end of the startup mode after a given time span ($T_{1P}$) has elapsed, if another received pulse ($P_{(n+1)R,\#1}$) is received; and
(c) performing the following actions after receiving a first received pulse ($P_{1R,\#2}$) at a responding endpoint of the two endpoints, at which the "TRANSMITTED" handshake mode is not active, with the responding endpoint in a "RECEIVE" handshake mode:
  (i) after receiving the first received pulse ($P_{1R,\#2}$), answering with a first transmit pulse ($P_{1T,\#2}$);
  (ii) repeating a second loop n times and at least once, which begins with the first transmit pulse ($P_{1T,\#1}$), after detecting the transmission of the transmit pulse ($P_{iT,\#1}$) then detecting by the responding endpoint whether another received pulse ($P_{(i+1)R,\#2}$) is received within the given time span ($T_{2P}$);
    (1) if no other received pulse ($P_{(i+1)R,\#2}$) is received, then ending the "RECEIVE" handshake mode and returning the system to the original detection state;
    (2) if another received pulse ($P_{(i+1)R,\#2}$) is received, then answering the other received pulse ($P_{(i+1)R,\#2}$) with another transmit pulse ($P_{(i+1)T,\#2}$);
  (iii) activating transmission of data towards the relevant endpoint of the optical transmission link after the given time span ($T_{1P}$) has elapsed in the n-th execution of the step (c) (ii), if another received pulse ($P_{(n+1)R,\#2}$) is received and answered with another transmit pulse ($P_{(n+1)T,\#2}$);
(d) and, wherein the received pulses (including the first received pulse for triggering the "TRANSMITTED" handshake mode) during the "RECEIVE" and the "TRANSMITTED" handshake modes are counted, and for a detection of more than a given number of received pulses that is greater than n+1, changing the system to the original detection state or generating an error signal.

2. The method of claim 1, wherein the activation of the transmission of data in the direction toward the relevant endpoint of the transmission link is recognized as a received pulse.

3. The method of claim 1, wherein the detection of more than the given number of received pulses, which is greater than n+2, causes the system to change to the original detection state or to generate the error signal.

4. A system for starting up an optical transmission link, the system comprising:
(a) first and second optical transmit-and-receive devices that are adapted to be connected to each other by means of an optical waveguide connection path;
(b) wherein, after the detection of a broken connection, the first and second optical transmit-and-receive devices are adapted to be switched into a startup mode and initially, in an original detection state, feed a query-transmit pulse ($P_{1T,\#1}$) to the optical waveguide connection path at given time intervals ($T_{RP}$);
(c) wherein each of the two transmit-and-receive devices is adapted to perform the following actions after transmission of the query-transmit pulse ($P_{1T,\#1}$) in a "TRANSMITTED" handshake mode:
  (i) the transmit-and-receive device repeating a loop n times and at least once, the loop beginning after, transmitting the query-transmit pulse ($P_{1T,\#1}$), first detecting whether a received pulse ($P_{iR,\#1}$) is received within a given time span ($T_{2P}$), wherein the given time span ($T_{2P}$) is longer than a duration of the query-transmit pulse ($P_{1T,\#1}$), then
    (1) ending the "TRANSMITTED" handshake mode and returning to the original detection state if pulse ($P_{iR,\#1}$) is not received;
    (2) answering with another transmit pulse ($P_{(i+1)T,\#1}$) if the received pulse ($P_{iR,\#1}$) is received;
  (ii) after transmission of a last additional transmit pulse ($P_{(n+1)T,\#1}$) the transmit-and-receive device detects whether another received pulse ($P_{(n+1)R,\#1}$) is received within the given time span ($T_{2P}$);
    (1) returning to the original detection state if no other received pulse ($P_{(n+1)R\ \#1}$) is received;
    (2) activating transmission of data towards the other transmit-and-receive device of the optical transmission link at the end of the startup mode after the given time span ($T_{1P}$) has elapsed if another received pulse ($P_{(n+1)R,\#1}$) is received; and
(d) wherein if the "TRANSMITTED" handshake mode is not active, each of the two transmit-and-receive devices carries out the following actions after receipt of a first received pulse ($P_{1R,\#2}$) in a "RECEIVE" handshake mode:
  (i) after receiving the first received pulse ($P_{1R,\#2}$) then answering with a first transmit pulse ($P_{1T,\#2}$);
  (ii) repeating a second loop n times and at least once, which begins with the first transmit pulse ($P_{1T,\#1}$), after detecting the transmission of the transmit pulse ($P_{iT,\#1}$) then the responding endpoint detects whether another received pulse ($P_{(i+1)R,\#2}$) is received within the given time span ($T_{2P}$);
    (1) if no other received pulse ($P_{(i+1)R,\#2}$) is received, then ending the "RECEIVE" handshake mode and returning the system to the original detection state;
    (2) if another received pulse ($P_{(i+1)R,\#2}$) is received, then answering the other received pulse ($P_{(i+1)R,\#2}$) with another transmit pulse ($P_{(i+1)T,\#2}$);
  (iii) activating transmission of data towards the relevant one of the transmit and receive devices of the optical link after the given time span ($T_{1P}$) has elapsed in the n-th execution of the step (c) (ii), if another received pulse ($P_{(n+1)R,\#2}$) is received and answered with another transmit pulse ($P_{(n+1)T,\#2}$); and
(e) wherein the transmit-and-receive device is constructed in such a way that the received pulses (including the first received pulse for triggering the "TRANSMITTED" handshake mode) during the "RECEIVE" and the "TRANSMITTED" handshake mode are counted, and for a detection of more than a given number of received pulses that is greater than n+1, changing the system to the original detection state or generating an error signal.

5. A system for starting up an optical transmission link, the system comprising:
- (a) first and second optical transmit-and-receive devices that are adapted to be connected to each other by means of an optical waveguide connection path;
- (b) wherein, after the detection of a broken connection, the first and second optical transmit-and-receive devices are adapted to be switched into a startup mode and initially, in an original detection state, feed a query-transmit pulse ($P_{1T,\#1}$) to the optical waveguide connection path at given time intervals ($T_{RP}$);
- (c) wherein each of the two transmit-and-receive devices is adapted to perform the following actions after transmission of the query-transmit pulse ($P_{1T,\#1}$) in a "TRANSMITTED" handshake mode:
  - (i) the transmit-and-receive device repeating a loop n times and at least once, the loop beginning after, transmitting the query-transmit pulse ($P_{1T,\#1}$), first detecting whether a received pulse ($P_{iR,\#1}$) is received within a given time span ($T_{2P}$), wherein the given time span ($T_{2P}$) is longer than a duration of the query-transmit pulse ($P_{1T,\#1}$), then
    - (1) ending the "TRANSMITTED" handshake mode and returning to the original detection state if pulse ($P_{iR,\#1}$) is not received;
    - (2) answering with another transmit pulse ($P_{(i+1)T,\#1}$) if the received pulse ($P_{iR,\#1}$) is received;
  - (ii) after transmission of a last additional transmit pulse ($P_{(n+1)T,\#1}$) the transmit-and-receive device detects whether another received pulse ($P_{(n+1)R,\#1}$) is received within the given time span ($T_{2P}$);
    - (1) returning to the original detection state if no other received pulse ($P_{(n+1)R,\#1}$) is received;
    - (2) activating transmission of data towards the other transmit-and-receive device of the optical transmission link at the end of the startup mode after the given time span ($T_{1P}$) has elapsed if another received pulse ($P_{(n+1)R,\#2}$) is received; and
- (d) wherein if the "TRANSMITTED" handshake mode is not active, each of the two transmit-and-receive devices carries out the following actions after receipt of a first received pulse ($P_{1R\#2}$) in a "RECEIVE" handshake mode:
  - (i) after receiving the first received pulse ($P_{1R,\#2}$) then answering with a first transmit pulse ($P_{1T,\#2}$);
  - (ii) repeating a second loop n times and at least once, which begins with the first transmit pulse ($P_{1T,\#1}$), after detecting the transmission of the transmit pulse ($P_{iT,\#1}$) then the responding endpoint detects whether another received pulse ($P_{(i+1)R,\#2}$) is received within the given time span ($T_{2P}$);
    - (1) if no other received pulse ($P_{(i+1)R,\#2}$) is received, then ending the "RECEIVE" handshake mode and returning the system to the original detection state;
    - (2) if another received pulse ($P_{(i+1)R,\#2}$) is received, then answering the other received pulse ($P_{(i+1)R,\#2}$) with another transmit pulse ($P_{(i+1)T,\#2}$);
  - (iii) activating transmission of data towards the relevant one of the transmit and receive devices of the optical link after the given time span ($T_{1P}$) has elapsed in the n-th execution of the step (c) (ii), if another received pulse ($P_{(n+1)R,\#2}$) is received and answered with another transmit pulse ($P_{(n+1)T,\#2}$); and
- (e) the system further characterized in that the detection of more than the given number of received pulses, which is greater than n+2, causes the transmit-and-receive device to change to the original detection state or generate the error signal.

6. A computer program product stored on one or more non-transitory computer readable media, and operable when executed for controlling an optical transmission link to perform the following functions:
- (a) after detecting a broken connection, first switching the system into a startup mode in an original detection state, a query-transmit pulse ($P_{1T,\#1}$) is then fed to the transmission link at two endpoints at given time intervals ($T_{RP}$),
- (b) wherein, after transmission of the query-transmit pulse ($P_{1T,\#1}$) at a relevant endpoint of the two endpoints, in a "TRANSMITTED" handshake mode, the following actions are performed:
  - (i) repeating a loop n times and at least once, the loop beginning after, transmitting the query-transmit pulse ($P_{1T,\#1}$), first detecting whether a received pulse ($P_{iR,\#1}$) is received within a given time span ($T_{2P}$), wherein the given time span ($T_{2P}$) is longer than a duration of the query-transmit pulse ($P_{1T,\#1}$), then
    - (1) returning to the original detection state if pulse ($P_{1R,\#1}$) is not received;
    - (2) answering with another transmit pulse ($P_{(i+1)T,\#1}$) if the received pulse ($P_{iR,\#1}$) is received;
  - (ii) after transmitting a last additional transmit pulse ($P_{(n+1)T,\#1}$) detecting whether another received pulse ($P_{(n+1)R,\#1}$) is received within the given time span ($T_{2P}$);
    - (1) returning to the original detection state if no other received pulse ($P_{(n+1)R,\#1}$) is received;
    - (2) activating transmission of data towards the other endpoint of the optical transmission link at the end of the startup mode after a given time span ($T_{1P}$) has elapsed if another received pulse ($P_{(n+1)R,\#1}$) is received; and
- (c) performing the following actions after receiving a first received pulse ($P_{1R,\#2}$) at a responding endpoint of the two endpoints, at which the "TRANSMITTED" handshake mode is not active, with the responding endpoint in a "RECEIVE" handshake mode:
  - (i) after receiving the first received pulse ($P_{1R,\#2}$) then answering with a first transmit pulse ($P_{1T,\#2}$);
  - (ii) repeating a second loop n times and at least once, which begins with the first transmit pulse ($P_{1T,\#1}$), after detecting the transmission of the transmit pulse ($P_{iT,\#1}$) then the responding endpoint detects whether another received pulse ($P_{(i+1)R,\#2}$) is received within the given time span ($T_{2P}$);
    - (1) if no other received pulse ($P_{(i+1)R,\#2}$) is received, then the "RECEIVE" handshake mode is ended and the system is returned to the original detection state;
    - (2) if another received pulse ($P_{(i+1)R,\#2}$) is received, then the other received pulse ($P_{(i+1)R,\#2}$) is answered with another transmit pulse $P_{(i+1)T,\#2}$);
  - (iii) activating transmission of data towards the relevant endpoint of the transmission link after the given time span ($T_{1P}$) has elapsed in the n-th execution of the step (c) (ii), if another received pulse ($P_{(n+1)R,\#2}$) is received and answered with another transmit pulse ($P_{(n+1)R,\#2}$), and
- (d) wherein the received pulses (including the first received pulse for triggering the "TRANSMITTED" handshake mode) during the "RECEIVE" and the "TRANSMITTED" handshake mode are counted, and for a detection of more than a given number of received pulses that is greater than n+1, changing the system to the original detection state or generating an error signal.

* * * * *

UNITED STATES PATENT AND TRADEMARK OFFICE
CERTIFICATE OF CORRECTION

PATENT NO. : 8,320,757 B2  Page 1 of 1
APPLICATION NO. : 12/294019
DATED : November 27, 2012
INVENTOR(S) : Alfred Schwandner et al.

It is certified that error appears in the above-identified patent and that said Letters Patent is hereby corrected as shown below:

At column 10, line 65: change "beginning after, transmitting" to read --beginning after transmitting--.
At column 12, line 9: change "beginning after," to read --beginning after--.
At column 13, line 17: change "beginning after," to read --beginning after--.
At column 14, line 15: change "beginning after, transmitting" to read --beginning after transmitting--.
At column 14, line 60: change "$(P_{(n+1)R,\#2})$, and" to read --$(P_{(n+1)T,\#2})$; and--.

Signed and Sealed this
Eighth Day of January, 2013

David J. Kappos
*Director of the United States Patent and Trademark Office*